US009487420B2

(12) United States Patent
Chisholm et al.

(10) Patent No.: US 9,487,420 B2
(45) Date of Patent: Nov. 8, 2016

(54) VEGETABLE OIL-BASED POLYMERS FOR NANOPARTICLE SURFACE MODIFICATION (71) Applicants: Bret Ja Chisholm, West Fargo, ND (US); Achintya Bezbaruah, West Fargo, ND (US); Harjyoti Kalita, Turlock, CA (US)

(72) Inventors: Bret Ja Chisholm, West Fargo, ND (US); Achintya Bezbaruah, West Fargo, ND (US); Harjyoti Kalita, Turlock, CA (US)

(73) Assignee: NDSU Research Foundation, Fargo, ND (US)

(*) Notice: Subject to any disclaimer, the term of this patent is extended or adjusted under 35 U.S.C. 154(b) by 576 days.

(21) Appl. No.: 13/896,874

(22) Filed: May 17, 2013

(65) Prior Publication Data
US 2013/0320255 A1 Dec. 5, 2013

Related U.S. Application Data (60) Provisional application No. 61/649,016, filed on May 18, 2012.

(51) Int. Cl.
C02F 1/70 (2006.01)
C08F 216/14 (2006.01)

(52) U.S. Cl.
CPC ............... C02F 1/70 (2013.01); C02F 1/705 (2013.01); C08F 216/1416 (2013.01); C08F 2216/1433 (2013.01)

(58) Field of Classification Search
CPC ...................................... C02F 1/705
See application file for complete search history.

(56) References Cited

U.S. PATENT DOCUMENTS

| 2,692,256 | A | 10/1954 | Bauer et al. |
|---|---|---|---|
| 4,006,270 | A | 2/1977 | Morgan |
| 4,010,126 | A | 3/1977 | Kuzma |
| 4,975,488 | A | 12/1990 | Furukawa et al. |
| 5,196,491 | A | 3/1993 | Cho et al. |
| 5,731,450 | A | 3/1998 | Alexander et al. |
| 6,689,485 | B2 | 2/2004 | Ponder et al. |
| 7,128,841 | B2 | 10/2006 | Zhang |
| 9,382,352 | B2 | 7/2016 | Chisholm et al. |
| 2003/0134409 | A1 | 7/2003 | Mallouk et al. |
| 2005/0199556 | A1 | 9/2005 | Zhang |
| 2006/0237371 | A1 | 10/2006 | Sylvester et al. |
| 2007/0259166 | A1 | 11/2007 | Killilea et al. |
| 2007/0293652 | A1 | 12/2007 | Schwendeman et al. |
| 2008/0234447 | A1 | 9/2008 | Shaffer et al. |
| 2009/0029162 | A1 | 1/2009 | Ukei et al. |
| 2009/0053268 | A1 | 2/2009 | DePablo et al. |
| 2009/0208872 | A1 | 8/2009 | Wolf et al. |
| 2010/0127415 | A1 | 5/2010 | Kim et al. |
| 2011/0042325 | A1 | 2/2011 | Bezbaruah et al. |
| 2011/0057340 | A1 | 3/2011 | Perichaud et al. |
| 2012/0316309 | A1 | 12/2012 | Chisholm et al. |
| 2013/0320255 | A1 | 12/2013 | Chisholm et al. |
| 2014/0260468 | A1 | 9/2014 | Bezbaruah et al. |
| 2015/0166701 | A1 | 6/2015 | Chisholm et al. |

FOREIGN PATENT DOCUMENTS

| JP | 09-103608 A | 4/1997 |
|---|---|---|
| JP | 2002-155114 A | 5/2002 |
| WO | WO 2005/092802 A1 | 10/2005 |
| WO | WO 2009/111722 A2 | 9/2009 |
| WO | WO 2009/111722 A3 | 12/2009 |
| WO | WO 2011/047369 A2 | 4/2011 |
| WO | WO 2011/060293 A1 | 5/2011 |
| WO | WO 2011/047369 A3 | 10/2011 |
| WO | WO 2013/041621 A1 | 3/2013 |
| WO | WO 2013/173734 A1 | 11/2013 |
| WO | WO 2014/144214 A2 | 9/2014 |
| WO | WO 2014/168728 A1 | 10/2014 |
| WO | WO 2014/144214 A3 | 11/2014 |
| WO | WO 2015/134080 A2 | 9/2015 |
| WO | WO 2015/134080 A3 | 10/2015 |

OTHER PUBLICATIONS

Alam et al., "Soy-Based Surface Active Copolymers as a Safer Replacement for Low Molecular Weight Surfactants," *ACS Sustainable Chem. Eng.*, Jan. 7, 2013; 1(1):19-22. Available online Oct. 4, 2012.

Kalita et al., "A Greener Approach to Enhance Colloidal Stability of NZVI for Groundwater Remediation," Slides presented with Doctoral Dissertation Oral Defense on Nov. 16, 2012, at North Dakota State University.

Krajangpan et al., "Challenges in Groundwater Remediation with Iron Nanoparticles: Enabling Colloidal Stability," (Chapter 8) in Nanotechnologies for Water Environment Applications; Environmental and Water Resources Institute/American Society for Civil Engineers, (Eds: Zhang, Surampalli, Lai, Hu, Tyagi, Lo) Reston, VA 2009; pp. 191-212.

Krajangpan et al., "Groundwater Arsenic Remediation Using Amphiphilic Polysiloxane Graft Copolymer Coated Iron Nanoparticles," Proceeding Paper. *World Environmental and Water Resources Congress 2011*. Proceedings paper published by the American Society of Civil Engineers (ASCE); Copyright 2011; pp. 1083-1088.

Krajangpan, et al., "Use of Amphiphilic Polysiloxane Graft Copolymer for Subsurface Delivery of Iron Nanoparticles for Groundwater Cleanup," Abstract No. 958 accompanying oral presentation on May 23, 2012, at the *2012 World Environmental & Water Resources Congress* (American Society of Civil Engineers and Environmental & Water Resources Institute). Albuquerque, NM; May 20-24, 2012.

(Continued)

*Primary Examiner* — Peter F Godenschwager (74) *Attorney, Agent, or Firm* — Mueting, Raasch & Gebhardt, P.A.

(57) ABSTRACT

Amphiphilic copolymers formed from plant oil-derived vinyl ether monomers and polyethylene glycol alkyl vinyl ethers are provided. Nanoparticles coated with these amphiphilic polymers are well-suited for water remediation applications.

18 Claims, 3 Drawing Sheets (56) References Cited

OTHER PUBLICATIONS

Mohapatra et al., "Synthesis and Characterization of Ultrafine Poly(vinylalcohol phosphate) Coated Magnetite Nanoparticles," *Journal of Nanoscience Nanotechnology*, Mar. 2006; 6(3):823-829.
Alam et al., "Synthesis and characterization of a novel epoxy-functional polymer from soybean oil," Abstract 109 accompanying oral presentation on Mar. 28, 2011, at the *241st American Chemical Society National Meeting and Exposition*: Anaheim, CA; Mar. 27-31, 2011.
Alam et al., "Bio-Based Polyvinyl Ethers for Coating Applications," slides accompanying oral presentation on Mar. 13, 2013, at the *2013 Coatings Tech Conference* (American Coatings Association): Rosemont, IL; Mar. 11-13, 2013.
Alam et al. "Novel high molecular weight vinyl ether polymers based on plant oils," Abstract L2 and slides accompanying oral presentation on Mar. 17, 2013, at the *6th Workshop on Fats and Oils as Renewable Feedstock for the Chemical Industry*: Karlsruhe, Germany: Mar. 17-19, 2013.
Alam et al. "Soy-based surface active copolymers as safer replacement for low molecular weight surfactants," Abstract 379 accompanying oral presentation on Apr. 9, 2013, at the *245th ACS National Meeting—Division of Natural and Renewable Polymers* (American Chemical Society): New Orleans, LA; Apr. 7-11, 2013.
Alam et al. "Novel Bio-Based Epoxy Resins," Abstract 251 and slides accompanying oral presentation on Apr. 10, 2013, at the *245th ACS National Meeting—Division of Cellulose & Renewable Materials* (American Chemical Society): New Orleans, LA; Apr. 7-11, 2013.
Alam et al., "Novel Polyvinylethers Derived from Plant Oils," Abstract 606 and slides accompanying oral presentation on Apr. 11, 2013, at the *245th ACS National Meeting—Division of Natural and Renewable Polymers* (American Chemical Society): New Orleans, LA; Apr. 7-11, 2013.
Alam et al., "Novel-Soybean Oil-Based Polyvinyl Ethers for Potential Application in Rubber Compounds," Presentation on Apr. 24, 2013, at the United Soybean Board Technical Advisory Panel meeting in Detroit, MI.
Aoshima et al., "Living Cationic Polymerization of Vinyl Monomers by Organoaluminum Halides. 3. Living Polymerization of Isobutyl Vinyl Ether by Ethyldichloroaluminum in the Presence of Ester Additives," *Macromolecules*, 1989; 22(3): 1009-1013.
Aoshima et al., "A Renaissance in Living Cationic Polymerization," *Chem. Rev.*, 2009; 109:5245-5287.
Archana et al., "Nanoparticle Delivery Vehicles for Groundwater Remediation: Sustainability Evaluation Through Biodegradation Studies," Sustainable Environmental Nanotechnology Session of the *2012 World Environmental & Water Resources Congress* (American Society of Civil Engineers and Environmental & Water Resources Institute). Albuquerque, NM: May 20-24, 2012. Proceedings paper published by the American Society of Civil Engineers; Copyright 2012: pp. 2823-2828.
Bezbaruah, "Remediation of alachlor and atrazine contaminated water with zero-valent iron nanoparticles," *J. Environ. Sci. Health Part B—Pesticides, Food Contaminants, and Agricultural Wastes*, 2009; 44(6):518-524. Available online Aug. 1, 2009.
Bezbaruah, "Nanoarchitectonic Approaches to Design Green Polymers to Enhance Effectiveness of Nanoparticles in Groundwater Remediation," Abstract accompanying oral presentation on Nov. 4, 2012, at the *Sustainable Nanotechnology Organization Conference*: Arlington, VA; Nov. 4-6, 2012.
Bezbaruah, "BRIGE: Enhancing Nanoparticle Dispersion through Surface Modification using Biopolymers," Award Abstract No. 1125674. National Science Foundation (CMMI—Division of Civil, Mechanical, and Manufacturing Innovation). Sep. 1, 2011 to Aug. 31, 2014 (estimated). 2 pages.
Bezbaruah et al., "Sensors and biosensors for endocrine disrupting chemicals: State-of-the-art and future trends," (Chapter 3) in *Treatment of Micropollutants in Water and Wastewater*. Virkutyte, Varma, Hoag, and Jegatheesan, (Eds.), Publisher: IWA Publishing; London, UK; 2010. pp. 93-128.
Bezbaruah et al., "Encapsulation of iron nanoparticles in alginate biopolymer for trichloroethylene remediation," 2011 *J. Nanoparticle Res.*, 13:6673-6681.
Brekke et al., "Nonconjugated Linseed Vinyl Ether by Vinyl Transetherification Preparation Procedure," *J. Am. Oil Chemists' Soc.*, 1960; 37(11):568-570.
Brentin et al., "Rubber Compounds: A Market Opportunity Study." Omni Tech International, Ltd., Midland, MI, Sep. 2011; pp. 1-92.
Chisholm, "An investigation of the utility of novel soybean oil-based copolymers in rubber compounds," Grant Abstract, United Soybean Board 2013, Retrieved from the Internet on Apr. 30, 2013: www.soybeancheckoffresearch.org/DetailsbyPaperid.php/id_Paper=3189.
Chisholm, "Novel polymers based on soybean oil," Grant Abstract, North Dakota Soybean Council 2013. Retrieved from the Internet on Apr. 30, 2013: www.soybeancheckoffresearch.org/DetailsbyPaperid.php/id_Paper=3090.
Chisholm, "Novel soybean oil-based polymers," Grant Abstract, North Dakota Soybean Council 2011. Retrieved from the Internet on Apr. 30, 2013: www.soybeancheckoffresearch.org/DetailsbyPaperid.php/id_Paper=1569.
Chisholm, "The Development of New Coating and Adhesive Systems Derived from Novel Plant Oil-based Polymers," Annual Report for Grant No. 2012-38202-19283 awarded by the National Institute of Food and Agriculture. Retrieved from the Internet on Apr. 30, 2014: www.reeis.usda.gov/web/crisprojectpages/0227969-the-development-of-new-coating-and-adhesive-systems-derived-from-novel-plant-oil-based-polymers.html.
Cisse et al., "Use of Biopolymer Entrapped Metal and Bacteria for Effective Removal of Sulfate from Surface Waters," Abstract No. 994 accompanying oral presentation on May 22, 2013; Emerging and Innovative Technologies in Water and Wastewater Treatment I Session of the *2013 World Environmental & Water Resources Congress* (American Society of Civil Engineers and Environmental & Water Resources Institute). Cincinnati, OH: May 19-23, 2013.
Clariant, "Your Universally Applicable Polymer Polyalkylen-/Polyethylenglykole". Brochure. 2007. 48 total pages.
Dufek et al., "Reactions of Unsaturated Fatty Alcohols. VII. Polymerization of Vinyl Ethers Catalyzed by Stannic and Ferric Chlorides," *J. Am. Oil Chemists' Soc.*, Jan. 1960; 37:37-40.
Dufek et al., "Reactions of Unsaturated Fatty Alcohols. XIII. Copolymers of Unsaturated Fatty Vinyl Ethers and Cyclic Monomers," *J. Am. Oil Chemists' Soc.*, May 1962; 39:238-241.
Eckey et al., "Production of Polyvinyl Esters by Ester Interchange," *J. Am. Oil Chemists' Soc.*, Apr. 1955; 32(4):185-191.
Franco et al., "Reduction of Hexavalent Chromium in Soil and Ground Water Using Zero-Valent Iron Under Batch and Semi-Batch Conditions," *Water, Air & Soil Pollution*, Feb. 2009; 197:49-60. Available online Jul. 31, 2008.
Gast et al., "Reactions of Unsaturated Fatty Alcohols. IV. Oxidative Degradation of Lauryl Isopropyl Ether," *J. Org. Chem.*, Feb. 1959; 24:160-165.
Gast et al., "Reactions of Unsaturated Fatty Alcohols. VIII. Preparation and Properties of Some Copolymers of Nonconjugated Linseed Vinyl Ether and Lower Alkyl Vinyl Ethers," *J. Am. Oil Chemists' Soc.*, Feb. 1960; 37:78-80.
He et al., "Transport of carboxymethyl cellulose stabilized iron nanoparticles in porous media: Column experiments and modeling," *Journal of Colloid and Interface Science*, Jun. 2009; 334(1):96-102. Available online Apr. 5, 2009.
Hovey et al., "Sustainable Groundwater Remediation with Biopolymer Coated Nanoparticles," Abstract No. 60; Sustainable Environmental Nanotechnology Session of the *2012 World Environmental & Water Resources Congress* (American Society of Civil Engineers and Environmental & Water Resources Institute). Albuquerque, NM: May 20-24, 2012.
Kalita et al., "Effects of different graft copolymer constituent groups on sedimentation characteristics of coated iron nanoparticles," *PMSE Preprints*, 2009; 100:683-685.
Kalita et al., "Novel Biodegradable Soybean Oil and Ethylene Glycol-Based Amphiphilic Copolymers for the Treatment of Zerovalent Iron Nanoparticles," Abstract ENVR 151 and slides accompanying oral presentation on Apr. 8, 2013, at the *245th ACS*

(56) References Cited

OTHER PUBLICATIONS

*National Meeting—Division of Transformative Nanotechnologies: Energy and Environment, Solutions and Challenges* (American Chemical Society). New Orleans, LA: Apr. 7-11, 2013. Abstract available online [retrieved Dec. 29, 2014]. Retrieved from the Internet: <abstracts.acs.org/chem/245nm/program/view.php?obj_id=181213&terms=>; 28 pages.

Kalita et al., "A Greener Approach to Enhance Colloidal Stability of NZVI for Groundwater Remediation," Abstract No. 976 accompanying oral presentation on May 22, 2013; Sustainable Environmental Nanotechnology Session of the 2013 World Environmental & Water Resources Congress (American Society of Civil Engineers and Environmental & Water Resources Institute). Cincinnati, OH: May 19-23, 2013.

Khot et al., "Development and application of triglyceride-based polymers and composites," *J. Polym. Sci., Part A: Polym. Chem.*, Oct. 17, 2001; 82(3):703-723.

Konwar et al., "Vegetable oil based highly branched polyester/clay silver nanocomposites as antimicrobial surface coating materials," Aug. 2010. *Prog. Org. Coatings* 68(4):265-273.

Krajangpan et al., "Polymer Modified Iron Nanoparticles for Environmental Remediation," *Polymer Preprint*, 2008 49:921-922.

Krajangpan et al., "Iron Nanoparticles Coated with Amphiphilic Polysiloxane Graft Copolymers: Dispersibility and Contaminant Treatability," *Environ. Sci. Technol.*, Sep. 18, 2012; 46(18):10130-10136. Available online on Jun. 25, 2012.

Liu et al., "TCE Dechlorination Rates, Pathways, and Efficiency of Nanoscale Iron Particles with Different Properties," *Environ. Sci. Technol.*, 2005; 39(5):1338-1345. Available online on Jan. 6, 2005.

Luo et al. "'Thiol-ene' photo-cured hybrid materials based on POSS and renewable vegetable oil," *J. Mat. Chem.*, 2011; 21(34):12753-12760. Available online on Jul. 27, 2011.

Meier et al., "Plant Oil Renewable Resources as Green Alternatives in Polymer Science," *Chem. Soc. Rev.*, 2007; 36: 1788-1802. Available online on Jul. 23, 2007.

NDSU News, "NDSU researchers receive competitive coatings award," Apr. 1, 2011, available online: www.ndsu.edu/news/view/article/10889/. Retrieved on Apr. 30, 2013; 1 page.

Pate et al., "Plant-based Polymers to Coat Iron Nanoparticles: Colloidal Stability and Contaminant Remediation Studies," Abstract No. 981 accompanying oral presentation on May 22, 2013; Emerging and Innovative Technologies in Water and Wastewater Treatment I Session of the *2013 World Environmental & Water Resources Congress* (American Society of Civil Engineers and Environmental & Water Resources Institute). Cincinnati, OH: May 19-23, 2013.

Ponder et al., "Remediation of Cr(VI) and Pb(II) Aqueous Solutions Using Supported, Nanoscale Zero-valent Iron," *Environ. Sci. Technol.*, 2000; 34:2564-2569.

Saleh et al., "Surface Modifications Enhance Nanoiron Transport and NAPL Targeting in Saturated Porous Media," *Environ. Eng. Sci.*, 2007; 24(1):45-57.

Saleh et al., "Ionic Strength and Composition Affect the Mobility of Surface-Modified $Fe^0$ Nanoparticles in Water-Saturated Sand Columns," *Environ. Sci. Technol.*, May 1, 2008; 42(9):3349-3355. Available online Apr. 5, 2008.

Schneider et al., "Reactions of Unsaturated Fatty Alcohols. II. Polymerization of Vinyl Ethers and Film Properties of Polymers," *J. Am. Oil Chemists' Soc.*, 1957; 34(5): 244-247.

Schneider et al., "Reactions of Unsaturated Fatty Alcohols. XIV. Preparation and Properties of Styrenated Fatty Vinyl Ether Polymers," *J. Am. Oil Chemists' Soc.*, May 1962; 39: 241-244.

Schrick et al., "Delivery Vehicles for Zerovalent Metal Nanoparticles in Soil and Groundwater," *Chemistry of Materials*, Jun. 1, 2004; 16(11):2187-2193. Available online Apr. 24, 2004.

Shabnam et al., "Microbial Degradation of Polydimethylsiloxane: Ramifications in Groundwater Remediation and Biomedical Applications," Abstract No. 989 accompanying oral presentation on May 20, 2013; Groundwater Remediation Technologies 2 Session of the *2013 World Environmental & Water Resources Congress* (American Society of Civil Engineers and Environmental & Water Resources Institute). Cincinnati, OH: May 19-23, 2013.

Teeter et al., "Reactions of Unsaturated Fatty Alcohols. I. Preparation and Properties of Some Vinyl Ethers," *J. Am. Oil Chemists' Soc.*, Sep. 1956; 33: 399-404.

Teeter et al., "Promising Materials for Protective Coatings. Vinyl Ethers of Polyunsaturated Fatty Alcohols," *Ind. Eng. Chem.*, Nov. 1958; 50(11): 1703-1704.

Teeter, "Vinyl Monomers Derived from Fats and Oils," Paper presented at the $53^{rd}$ Annual Meeting of The American Oil Chemists' Society on May 7, 1963 in New Orleans, LA. Published in the *J. Am. Oil Chemists' Soc.*, Apr. 1963; 40(4): 143-156.

Thompson et al., "Reductive Dechlorination of Chloroacetanilide Herbicide (Alachlor) Using Zero-Valent Iron Nanoparticles," *Environmental Engineering Science*, Mar. 8, 2010; 27(3)227-232. Available online Feb. 26, 2010.

Tiraferri et al., "Enhanced transport of zerovalent iron nanoparticles in saturated porous media by guar gum," *Journal of Nanoparticle Research*, Apr. 2009; 11(3):635-645. Available online May 23, 2008.

"Vegetable Oil-Based Polymers for Nanoparticle Surface Modification," NDSU Research Foundation Technology Case RFT-413. Invention Summary Retrieved from the Internet on Mar. 2, 2013: ndsuresearchfoundation.org/rft413.

Wan Rosli et al., "UV Radiation Curing of Epoxidized Palm Oil-Cycloaliphatic Diepoxide System Induced by Cationic Photoinitiators for Surface Coatings," *Eur. Polym. J.*, 2003; 39(3): 593-600.

Zlatanic et al., "Effect of Structure on Properties of Polyols and Polyurethanes Based on Different Vegetable Oils," *J. Polym. Sci., Part B: Polym. Phys.*, 2004; 42: 809-819.

Zou et al., "UV-Curable Cycloaliphatic Epoxide Based on Modified Linseed Oil: Synthesis, Characterization and Kinetics," *Macromol. Chem. Phys.*, 2005; 206(9): 967-975.

International Patent Application No. PCT/US2010/056580, filed Nov. 12, 2010; International Search Report and Written Opinion mailed Jan. 24, 2011.

International Patent Application No. PCT/US2010/056580, filed Nov. 12, 2010; International Preliminary Report on Patentability mailed May 15, 2012.

International Patent Application No. PCT/US2013/041621, filed May 17, 2013; International Search Report and Written Opinion mailed Oct. 21, 2013.

Alam, "Synthesis and Characterization of Novel Polyvinylether Polymers Produced Using Carbocationic Polymerization," Doctoral Dissertation; cover date—Oct. 2011. North Dakota State University. 370 pages. Available Jun. 1, 2012.

Time- 0 m  Time- 15m
Time- 1h  Time- 2 h

Figure 4

CMCNT in Water  MCNT in Water — Clear water layer

VEGETABLE OIL-BASED POLYMERS FOR NANOPARTICLE SURFACE MODIFICATION

This application claims the benefit of U.S. Provisional Application Ser. No. 61/649,016, filed May 18, 2012, which is incorporated by reference herein.

GOVERNMENT FUNDING

This invention was made with government support under Grant No. CMMI-1125674, awarded by the National Science Foundation. The government has certain rights in the invention.

BACKGROUND

Nanoscale structures such as nanoparticles and nanotubes have unique physiochemical properties. Their extremely high surface area, for example, provides many advantages over conventional particles with dimensions in the micron scale. Carbon nanotubes, additionally, exhibit extraordinary thermal conductivity and unique mechanical and electrical properties.

Because of their unique properties, nanoscale structures have many diverse uses. For example, metal nanoparticles are attractive for environmental remediation of various contaminants. Various chlorinated aliphatic hydrocarbons and toxic metals can be remediated using metal nanoparticles such as zero valent iron (Fe) nanoparticles (known as FeNP or nZVI—nanoscale zero valent iron). Metal nanoparticles have also been used for the remediation of groundwater contaminated with chemicals used in explosives. The effectiveness of a remediation approach depends on various factors, one of which is the ability to access the contaminant(s) with the metal nanoparticles. $Fe^0$ nanoparticles, for example, are highly reactive and react rapidly with surrounding media in the subsurface (dissolved oxygen and/or water, for example). Thus, significant loss of reactivity can occur before the particles are able to reach the target contaminant.

For effective bioremediation and a variety of applications, it is necessary to individually disperse and suspend the nanoparticles in a liquid medium. One of the most important liquid mediums is water since it is cheap and non-toxic. Due to the high density of many nanoparticles and strong interparticle surface interactions, suspension of nanoparticles in water is challenging. Metal nanoparticles, such as $Fe^0$ nanoparticles, tend to flocculate or aggregate when added to water due to interparticle van der Waal interactions. Flocculation and aggregation reduce the effective surface area of the metal and cause precipitation or sedimentation of the metal from the aqueous phase.

WO2009/111722 (Bezbaruah et al., published 11 Sep. 2009) describes metal nanoparticles entrapped in an amphiphilic polysiloxane graft copolymer (APGC). The resultant nanoparticle exhibits increased colloidal stability, reduced oxidation by non-target compounds, and affinity toward water/contaminant interfaces. However, the copolymer is not sufficiently biodegradable to render the nanoparticle delivery vehicles described therein suitable for all environmental applications.

SUMMARY OF THE INVENTION

The present invention provides compounds, composites, aggregates, compositions, delivery vehicles, systems, and methods for dispersing and suspending nanoscale and micron scale structures, preferably metal nanoparticles and carbon nanotubes, more preferably zero-valent iron ($Fe^0$) nanoparticles (FeNPs) in aqueous environments. Methods of making and using said compounds, composites, aggregates, compositions, delivery vehicles, and systems are also provided.

The copolymer compounds of the invention can be used to facilitate improved dispersion and suspension of FeNPs in water for application in ground water remediation. The novel compositions effectively inhibit sedimentation of FeNPs from water. For example, copolymer compounds of the invention can be used to protect, disperse and suspend FeNPs in decontamination efforts involving chlorinated hydrocarbons, such as tetrachloroethylene. The copolymers described herein are not only high effective with respect to suspending nanoparticles in water but also exhibit high biodegradability. Biodegradability is important for environmental applications because the polymer is typically not recovered after treatment of a ground water contaminant plume. In addition, compared to other approaches, this copolymer technology enables compositions to be highly tailored or optimized for a given nanoparticle and application.

The copolymers of the invention can be used to deliver inorganic remediation agents and organic or bioremediation agents. Bioremediation agents include microorganisms or microorganism cultures, enzymes, enzyme additives, nutrients, nutrient additives, and the like that significantly increase the rate of biodegradation to mitigate the effects of the contaminant.

The copolymers of the invention are amphiphilic and thus are also useful in detergent compositions. Because they are biodegradable and non-toxic, they find additional utility as a means for solubilizing, dispersing and/or suspending therapeutic or diagnostic agents in medical or veterinary applications, and as vehicles for drug delivery.

The copolymers can effectively suspend carbon nanotubes in water. In addition, due to unsaturation in the vinyl ether (e.g., 2-vinyoxyethyl soyate) repeat units, the aqueous suspensions of carbon nanotubes can be combined with a catalyst package for auto-oxidation cure to produce cured coatings containing dispersed carbon nanotubes. Further, the copolymers of the invention are surface active due to their amphiphilic nature. In addition, it is known that carboxylic acid groups can be used to chelate metal ions in water. Thus, the compounds of the invention may provide antimicrobial activity, for example, via a cell wall disruption mechanism, and can find utility as disinfectants. The compounds of the invention may also be useful for removing microbial biofilms.

Other applications include the use of the copolymers to suspend nanostructures in conductive inks.

An exemplary polymer is a copolymer that includes repeat units derived from a plant oil-derived vinyl ether monomer, such as 2-vinyoxyethyl soyate (2-VOES), and polyalkylene glycol alkyl vinyl ether, preferably a polyethylene glycol alkyl vinyl ether, such as triethylene glycol ethyl vinyl ether (TEGEVE) or triethylene glycol methyl vinyl ether (TEGMVE). In a preferred embodiment, at least one functional group, such as a carboxylic acid group, that is capable of chelating or coordinating to a metal ion or atom is grafted onto some of the repeat units derived from the plant-oil derived vinyl ether monomer (e.g., the 2-VOES).

Exemplary plant oil-derived vinyl ether monomers useful as a repeat unit of the copolymer are described in WO2011/060293 (Chisholm et al.), published May 19, 2011. An exemplary plant-oil derived monomer has the structure wherein $R^1$ is a divalent organic group that functions as a spacer between the vinyl ether and the heteroatom; Z is a heteroatom selected from O, N or S; $R^2$ contains an aliphatic group derived from a renewable resource such as a plant oil; and $R^6$, $R^7$, and $R^8$ are each independently H or alkyl. The plant oil is preferably a vegetable or nut oil, more preferably soybean oil. Use of a plant oil-derived polymer as a component of the copolymer backbone advantageously increases the biodegradability and biocompatibility of the copolymer, opening up many new environmental, industrial and medical/veterinary applications.

The fatty acid pendant group of the vinyl ether monomer can be derived directly or indirectly from a plant oil. For example, the vinyl ether compound can based on a plant oil-derived compound such as a transesterified plant oil-based long chain alkyl ester, such as a biodiesel compound, for example an alkyl soyate such as methyl soyate.

In some embodiments, the copolymer of the invention contains a plurality of plant oil derived monomers, such that for each of the plurality of monomers, $R^2$ is independently an aliphatic group derived from a renewable resource such as a plant oil, preferably a C8-C21 aliphatic group derived from a plant oil.

An exemplary polyethylene glycol alkyl vinyl ether useful as a component of the copolymer has the structure wherein $R^{12}$ is divalent organic group that functions as a spacer between the vinyl ether and the second ether functionality; $R^{13}$ is a monovalent alkyl, preferably methyl or ethyl; $R^9$, $R^{10}$, and $R^{11}$ are each independently H or alkyl; and n is 2 to 20. The plant oil is preferably a vegetable or nut oil, more preferably soybean oil Exemplary functional groups which can chelate or coordinate to a metal ion or atom include, for example, carboxylic acid and phosphonate. The resulting copolymer is an amphiphilic copolymer and has coordinating groups that allow it to suspend nanoparticles or carbon nanotubes. The chelating or coordinating groups, in conjunction with the aliphatic region of the plant-oil-based vinyl ether component of the copolymer, allow for efficient adsorption of copolymer molecules onto the surface of the FeNP while the water-soluble polyethylene glycol copolymer components allow for dispersibility and colloidal stability in an aqueous medium. The hydrophobicity of the plant oil fatty acid chain causes the copolymer to have a high affinity for the water/contaminant interface, and also allows permeation of non-polar or hydrophobic contaminants through the copolymer covering to the FeNP surface.

Also provided are coated micron scale and nanoscale structures, such as coated nanoparticles and nanotubes, which are coated with the copolymer of the invention. Compositions that include the copolymers are also provided, as well as compositions that include the coated micron scale and nanoscale structures. Methods of making and using the coated structures are also provided.

DETAILED DESCRIPTION OF ILLUSTRATIVE EMBODIMENTS

The copolymer of the invention includes, as first and second repeat units, at least one plant oil-derived vinyl ether monomer component, and at least one polyalkylene glycol alkyl vinyl ether component.

An illustrative plant oil-derived vinyl ether monomer is vinyl ether of soybean oil fatty acid esters (VESFA), also referred to herein interchangeably as 2-vinyloxyethyl soyate (2-VOES), although it should be understood that the monomer is not limited to a monomer produced from soybean oil. As noted elsewhere herein, any plant oil can be used, for example corn oil. The various methods and uses described herein, therefore, although described for convenience with reference to monomer derived from soybean oil, apply generally to embodiments derived from any suitable plant oil. VESFA is derived from the transesterification of soybean oil (the exemplary plant oil) with ethylene glycol monovinylether. Because soybean oil contains five different fatty acids (stearic acid, oleic acid, linoleic acid, palmitic and linolenic acid) the vinylether monomers produced by transesterification of soybean oil include a mixture of vinylethers of stearic acid, oleic acid, linoleic acid, palmitic acid and linolenic acid esters.

Plant oils that can be used to form the vinyl ether monomer component of the copolymer include vegetable oils, such soybean oil, linseed oil, tung oil, oiticica oil, perilla oil, safflower oil and corn oil; oil from trees or wood pulp such as tall oil and palm oil, or nut-based oils such as cashew oil. The vegetable oils include at least one triglyceride and contain fatty acids such as at least one of oleic acid, stearic acid, linoleic acid, linolenic acid, palmitic acid, lauric acid, myristic acid, arachidic acid, and palmitioleic acid.

Vinyl ether monomers that are useful as components of the copolymer of the invention include vinyl ethers of plant oil-derived fatty acids, more particularly, vinylethers of soybean oil-derived fatty acids (VESFA). A preferred monomer has the structure $R^6R^7C=C(R^8)-O-R^1-Z-C(O)-R^2$, wherein $R^1$ is divalent organic group that functions as a spacer between the vinyl ether and the heteroatom; Z is a heteroatom selected from O, N or S; $R^2$ contains an aliphatic group derived from a renewable resource such as a plant oil, such as soybean oil; and $R^6$, $R^7$, and $R^8$ are each independently H or alkyl.

A particularly preferred monomer has the structure $CH_2=CH-O-R^1-Z-C(O)-R^2$.

The spacer, $R^1$, can be a branched or unbranched hydrocarbon having 1 to 40 or more carbon atoms; it may be substituted or unsubstituted at one or more sites; it may be saturated or unsaturated at one or more sites; it may contain one or more monocyclic or polycyclic divalent ring structures (aliphatic or aromatic); and it may contain one or more divalent functionalities such as ether, thioether, ester, thioester, amine and amido.

In one embodiment, the spacer $R^1$ is $(CR^3R^4)_m$ wherein, for each instance of m, each of $R^3$ and $R^4$ is independently selected from H, methyl, ethyl, propyl, hydroxy, methyl, methoxy, aryl, and halo, including substituted forms thereof; and wherein m is 1 to 10, more preferably m=1, 2, 3, 4 or 5.

In another embodiment, the spacer $R^1$ is $(CR^3R^4)_n-X-(CR^3R^4)_p$ wherein n and p are each independently 0, 1, 2, 3, 4 or 5; X is O (ether), C(O) (carbonyl), OC(O) (ester), C(O)O (ester), S (thioether), OS(O) (thioester), S(O)O (thioester), $N(R^5)$ (a secondary tertiary amine, wherein $R^5$ is H or an organic substituent), N(H)C(O) (amide) C(O)N(H) (amide), or a substituted unsubstituted monocyclic or polycyclic cycloaliphatic or aromatic moiety, preferably cyclohexyl or benzyl; and $R^3$ and $R^4$ are independently selected from H, methyl, ethyl, propyl, hydroxy, methyl, methoxy, aryl, and halo, including substituted forms thereof. Monomers having a spacer ($R^1$) that contains a cycloaliphatic moiety may be expected to be more rigid, which may increase the glass transition temperature of a polymer into which it is incorporated, a property that would be desirable for many applications.

$R^2$ is any aliphatic moiety obtained from a plant oil. $R^2$ is preferably a C8-C21 aliphatic group, more preferably a C8-C21 alkyl group or a C8-C21 alkenyl group, even more preferably a linear C8-C21 alkyl group or a linear C8-C21 alkenyl group. The aliphatic group preferably includes a linear chain of 8, 9, 10, 11, 12, 13, 14, 15, 16, 17, 18, 19, 20, 21 or 22 carbon atoms, and preferably contains 0 (saturated), 1 (monounsaturated), 2 or 3 double bonds. Preferred polymers, co-polymers, and polymeric materials are those derived from a preferred monomer.

The plant oil-derived vinyl ether monomer may contain an ester linkage (in embodiments where Z=O), an amide linkage (in embodiments where Z=N) or a thioester linkage (in embodiments where Z=S). Embodiments having an amide linkage may be expected to exhibit certain advantages with respect to thermal and mechanical properties due to the introduction of hydrogen bonding via the amide nitrogen.

Exemplary vinyl ether monomers, wherein $R^2$ is derived from a plant oil, are shown below.

Additional exemplary vinyl ether monomers and methods of making them are described in WO2011/060293 (Chisholm et al.).

As used herein, the terms "aliphatic" or "aliphatic group" mean a saturated or unsaturated linear (i.e., straight chain), cyclic, or branched hydrocarbon group. The hydrocarbon or hydrocarbon group can be substituted or unsubstituted. The term "aliphatic" encompasses monovalent and divalent aliphatic groups, including alkyl (e.g., —CH$_3$) (or alkylene if within a chain such as —CH$_2$—), alkenyl (or alkenylene if within a chain), and alkynyl (or alkynylene if within a chain) groups, as well as substituted forms thereof, for example.

The terms "alkyl" or "alkyl group" mean a saturated linear or branched hydrocarbon group including, for example, methyl, ethyl, isopropyl, t-butyl, amyl, heptyl, dodecyl, octadecyl, amyl, 2-ethylhexyl, and the like, as well as their divalent counterparts. "Alkyl" and "alkylene" are also meant to include substituted alkyls and alkylenes. Suitable substituents include aryl groups (which may themselves be substituted), as in the case where the "alkyl" is a phenyl-substituted methyl group (e.g., a benzyl moiety). Other suitable substituents include heterocyclic rings (saturated or unsaturated and optionally substituted), hydroxy groups, alkoxy groups (which is meant to include aryloxy groups (e.g., phenoxy groups)), thiol groups, alkylthio groups, arylthio groups, amine groups (which is meant to include unsubstituted, monosubstituted, or disubstituted (e.g., with aryl or alkyl groups) amine groups), carboxylic acid groups (which is meant to include COOH groups as well as carboxylic acid derivatives, e.g., carboxylic acid esters, amides, etc.), phosphine groups, sulfonic acid groups, halogen atoms (e.g., F, Cl, Br, and I), and the like. Further, alkyl groups bearing one or more alkenyl or alkynyl substituents (e.g., a methyl group itself substituted with a prop-1-en-1-yl group to produce a but-2-en-1-yl substituent or a methyl group itself substituted with a vinyl group to produce an allyl substituent) are meant to be included in the meaning of "alkyl."

The terms "alkenyl" or "alkenyl group: mean an unsaturated, linear or branched monovalent or divalent hydrocarbon group with one or more olefinically unsaturated groups (i.e., carbon-carbon double bonds), such as a vinyl group. Alkenyl groups include, for example, ethenyl, propenyl, butenyl, 1-methyl-2-buten-1-yl, and the like.

The term "alkynyl group" means an unsaturated, linear or branched monovalent or divalent hydrocarbon group with one or more carbon-carbon triple bonds. Representative alkynyl groups include, but are not limited to, ethynyl, 2-propynyl (propargyl), 1-propynyl, and the like.

The term "aliphatic" also encompasses monovalent or divalent cyclic hydrocarbons such as cycloaliphatic groups or heterocyclic groups. The term "cycloaliphatic" refers to a cyclic or polycyclic hydrocarbon group, which may have properties resembling those of linear aliphatic groups. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. The term "cycloaliphatic" also includes aliphatic rings that are fused to one or more aromatic or nonaromatic rings, such as decahydronaphthyl or tetrahydronaphthyl, where the radical or point of attachment is on the aliphatic ring. The term "heterocyclic group" means a cyclic or polycyclic closed ring hydrocarbon in which one or more of the atoms in the ring is an element other than carbon (e.g., nitrogen, oxygen, sulfur, etc.).

Unless otherwise specified, an aliphatic group can contain 1 or 2 or 3 or 4, and so on, up to 38 or 39 or 40 carbon atoms; that is, 1 to 40 carbon atoms. In certain embodiments, aliphatic groups contain 1 to 20 carbon atoms. In certain embodiments, aliphatic groups contain 2 to 20 carbon atoms. In certain embodiments, aliphatic groups contain 1 to 12 carbon atoms, or 1 to 8 carbon atoms, or 1 to 6 carbon atoms, 1 to 5 carbon atoms, 1 to 4 carbon atoms, 1 to 3 carbon atoms, or 1 to 2 carbons atoms. Exemplary aliphatic groups include, but are not limited to, linear or branched alkyl, alkylene, alkenyl, and alkynyl groups, and hybrids thereof such as (cycloalkyl)alkyl, (cycloalkenyl)alkyl or (cycloalkyl)alkenyl.

The term "unsaturated", as used herein, means that a moiety has one or more double or triple bonds.

An aliphatic group may be unsubstituted, or optionally substituted with one or more substituents. "Substituted" means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Suitable substituents include, but are not limited to, alkyl, alkenyl, alkynyl, cycloalkyl, heterocycloalkyl, aryl, heteroaryl, aroyl, halo (e.g., F, Cl, Br and I), hydroxy, oxo, nitro, alkoxy, amino, amido, imino, azido, mercapto, acyl, carbamoyl, carboxy, carboxamido, amidino, guanidino, thiol, alkylthiol, arylthio, sulfonyl, sulfinyl, sulfonamido, phosphine, formyl, cyano, and ureido groups.

The term "alkoxy", as used herein refers to an alkyl group, as previously defined, attached to the parent molecule through an oxygen atom. Examples of alkoxy, include but are not limited to, methoxy, ethoxy, propoxy, isopropoxy, n-butoxy, tert-butoxy, neopentoxy, and n-hexoxy.

The term "acyl", as used herein, refers to a carbonyl-containing functionality, e.g., —C(=O)R', wherein R' is hydrogen or an optionally substituted aliphatic, heteroaliphatic, heterocyclic, aryl, heteroaryl group, or is a substituted (e.g., with hydrogen or aliphatic, heteroaliphatic, aryl, or heteroaryl moieties) oxygen or nitrogen containing functionality (e.g., forming a carboxylic acid, ester, or amide functionality). The term "acyloxy", as used here, refers to an acyl group attached to the parent molecule through an oxygen atom.

The terms "aromatic," "aromatic group," "aryl" and "aryl group" mean a mono- or polynuclear aromatic hydrocarbon group. These hydrocarbon groups may be substituted with heteroatoms, which can be in the form of functional groups. The term "aromatic" or "aryl" used alone or as part of a larger moiety as in "aromatic hydrocarbon," "aralkyl," "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring" or "aromatic ring." In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenantriidinyl, or tetrahydronaphthyl, and the like.

In describing substituents, the term "radical" is sometimes used. In this context, "radical" means a moiety or functional group having an available position for attachment to the structure on which the substituent is bound. In general the point of attachment would bear a hydrogen atom if the substituent were an independent neutral molecule rather than a substituent.

The term "heteroatom" means an element other than carbon (e.g., nitrogen, oxygen, sulfur, chlorine, etc.). A "hetero-" moiety as described herein, such as a heteroaliphatic group, a heterocyclic group and the like, refers to a moiety having, in place of one or more carbon atoms, a heteroatom independently selected from nitrogen, oxygen, or sulfur. Examples of saturated or partially unsaturated heterocyclic groups include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle", "heterocyclyl", "heterocyclyl ring", "heterocyclic group", "heterocyclic moiety", and "heterocyclic radical", are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

Preferably, the vinyl ether monomer component of the copolymer of the invention is derived from a vegetable or a nut oil; more preferably, it is a derivative of one of the plant fatty acids found in soybeans: stearic acid, oleic acid, palmitic, linoleic acid or linolenic acid. The fatty acid pendant group of the vinyl ether monomer can be derived directly or indirectly from a plant oil. For example, the vinyl ether compound can be derived from a plant oil-derived compound such as a transesterified plant oil-based long chain alkyl ester, such as a biodiesel compound, for example an alkyl soyate such as methyl soyate.

In one embodiment, monomers are synthesized using base-catalyzed transesterification of a plant oil, such as soybean oil, with ethylene glycol vinyl ether, propylene glycol vinyl ether, isopropylene glycol vinyl ether, butylene glycol vinyl ether or iso-butylene glycol vinyl ether. The base can be potassium hydroxide, sodium hydroxide, or any convenient base. Ethylene glycol vinyl ether and butylene glycol vinyl ether are relatively inexpensive chemicals, and the resulting monomers are isolated in high purity. In another embodiment, the monomer is synthesized using acid-catalyzed transesterification. More generally, any convenient transesterification method can be used to generate the vinyl ether plant oil-derived fatty acid ester monomers of the invention.

Vinyl ethers synthesized from fatty alcohols are known to the art. Fatty alcohols are typically produced from hydrogenation of fatty acids. The conversion of the fatty alcohols to the vinyl ether can be accomplished using vinylation with acetylene, and the process involves several steps. WO2011/060293 (Chisholm et al.) describes the production of a plant oil-derived vinyl ether directly from a reaction between a vinyl ether possessing a nucleophilic group and the plant oil, preferably vegetable oil, by a single-step simple nucleophilic substitution reaction similar to the process used to produce biodiesel (i.e. methyl esters of vegetable oil fatty acids). The resulting monomer is much easier and less expensive to make.

An illustrative polyethylene glycol alkyl vinyl ether component of the copolymer has the structure wherein $R^{12}$ is divalent organic group that functions as a spacer between the vinyl ether and the second ether functionality; $R^{13}$ is a monovalent alkyl, preferably methyl or ethyl; $R^9$, $R^{10}$, and $R^{11}$ are each independently H or alkyl; and n is 2 to 20.

The spacer, $R^{12}$, can be a branched or unbranched hydrocarbon having 1 to 40 or more carbon atoms; it may be substituted or unsubstituted at one or more sites; it may be saturated or unsaturated at one or more sites; it may contain one or more monocyclic or polycyclic divalent ring structures (aliphatic or aromatic); and it may contain one or more divalent functionalities such as ether, thioether, ester, thioester, amine and amido.

In one embodiment, the spacer $R^{12}$ is $(CR^3R^4)_m$ wherein, for each instance of m, each of $R^3$ and $R^4$ is independently selected from H, methyl, ethyl, propyl, hydroxy, methyl, methoxy, aryl, and halo, including substituted forms thereof; and wherein m is 1 to 10, more preferably m=1, 2, 3, 4 or 5.

In another embodiment, the spacer $R^{12}$ is $(CR^3R^4)_n$—X—$(CR^3R^4)_p$ wherein n and p are each independently 0, 1, 2, 3, 4 or 5; X is O (ether), C(O) (carbonyl), OC(O) (ester), C(O)O (ester), S (thioether), OS(O) (thioester), S(O)O (thioester), $N(R^5)$ (a secondary tertiary amine, wherein $R^5$ is H or an organic substituent), N(H)C(O) (amide) C(O)N(H) (amide), or a substituted unsubstituted monocyclic or polycyclic cycloaliphatic or aromatic moiety, preferably cyclohexyl or benzyl; and $R^3$ and $R^4$ are independently selected from H, methyl, ethyl, propyl, hydroxy, methyl, methoxy, aryl, and halo, including substituted forms thereof. Monomers having a spacer ($R^{12}$) that contains a cycloaliphatic moiety may be expected to be more rigid, which may increase the glass transition temperature of a polymer into which it is incorporated, a property that may be desirable for some applications.

A particularly preferred polyethylene glycol alkyl vinyl ether component of the copolymer is triethylene glycol ethyl vinyl ether (TEGEVE), which has the structure A copolymer of the invention is formed from at least one plant oil-derived vinyl ether monomer and at least one polyethylene glycol alkyl vinyl ether. The copolymer optionally include other monomers, such as monovinylidene monomers. The copolymer can be a random copolymer, a block copolymer, a star polymer, a telechelic polymer, or a graft copolymer. It may or may not be cross-linked. A preferred copolymer contains the repeating units:

wherein the R groups, Z and n are as defined above for the component monomers; and wherein x is 2 to 500 and y is 2 to 500.

The copolymer is optionally activated or functionalized with one or more activating or functional groups capable of chelating or coordinating to a metal ion or atom. In a preferred embodiment, the $R^2$ group(s) are functionalized or activated at the site of one or more double bonds in the plant oil-derived aliphatic chain. Activation or functionalization occur either before, during or after the copolymerization reaction. Preferably, the attachment of the chelating/coordinating groups occurs after copolymerization. These functional groups typically include oxygen, sulfur or nitrogen atoms and include, for example, carboxylic acid and phosphonate. The functional groups attached to the copolymer can contain single or multiple coordinating/chelating groups. For example, the copolymer can be activated or functionalized with an ethylenediaminetetraacetic acid (EDTA) or derivative thereof, as described below, which imparts between 2 and 4 carboxylic acids per reactive site on the copolymer.

The copolymer preferably may contain a plurality of different plant oil-derived vinyl ether monomers, in that $R^2$ can encompass a plurality of aliphatic groups $R^2$ where n=1, 2, 3, 4, 5, 6, 7, 8, 9, or 10. The aliphatic groups are optionally activated or functionalized. For example, when the monomers are derived from an oil such as soybean oil that contains five fatty acids, the copolymer may contain plant oil-derived vinyl ether monomers having five different aliphatic groups, e.g., $R_1$=stearate, $R_2$=oleate, $R_3$=linoleate, $R_4$=linoleate and $R_5$=linolenate. It should be understood that the five monomers are typically randomly dispersed throughout the polymer, according to their abundance. An exemplary composition of soybean oil is about 11% palmitic acid, about 4% stearic acid, about 23% oleic acid, about 54% linoleic acid, and about 7% linolenic acid.

An exemplary copolymerization reaction between 2-vinyoxyethyl soyate (2-VOES), and triethylene glycol ethyl vinyl ether (TEGEVE) is shown below:

where x and y are independently 2 to 500.

The resulting copolymer can be functionalized by grafting carboxylic acid onto the plant oil-based component, for example by using a carboxylated thiol, in this case mercaptopropionic acid.

More generally, the copolymerization reaction can be shown as:

wherein the R groups, Z, n, x, and y, are defined above.

Functionalization of the resulting copolymer can be accomplished, for example, by reacting it with a functionalized thiol wherein $R^1$ through $R^{13}$, Z, n, x and y are as defined above; R is preferably C; $R^{14}$ is optional and, if present, is a spacer as defined elsewhere herein, preferably an alkyl, at least one of $R^{15}$, $R^{16}$, and $R^{17}$ includes at least one functional group, such as carboxyl or phosphonate, which is capable of chelating or coordinating to a metal ion or atom; the other(s) of $R^{15}$, $R^{16}$, and $R^{17}$ are each independently H or alkyl; and wherein of $R^{18}$ contains the reaction product of The invention is not limited by the chemistry used to attach the functional group to the co-polymer. The chemistry exemplified herein involves the use of a thiol-ene reaction to attach the functional group (in this case, a carboxylic acid) directly. Alternatively, a thiol such as 2-mercaptoethylamine can be reacted with the plant oil-derived polymer chain to yield a primary amine, which can in turn be reacted with, for example, two equivalents of a haloacetic acid to produce a doubly derivatized compound. Many other chemistries are known that can make use of the reactive double bond(s) in the plant-oil derived chain as attachment sites for the chelating/coordinating group(s). For example, the double bonds can be epoxidized, then reacted with a dicarboxylic acid in the presence of a base catalyst in ring opening reaction that covalently attaches the dicarboxylic acid, leaving on of the carboxylic acids free and available for chelating or coordinating. Cross-linking can be controlled or avoided by providing the dicarboxylic acid in excess. Many different carboxylic acids are commercially available for use as reactants. Other chemistries allow attachment of a chelating/coordinating agent to an acrylated plant-oil derived chain, for example via a Michael addition reaction.

Copolymerization reactions can be accomplished using any suitable copolymerization technique. For example, carbocationic polymerization or free radical polymerization can be used. Exemplary copolymerizations are described in the following examples.

Also provided by the invention are coated materials and structures such as small particles and tubes. The coated materials are coated with a copolymer of the invention in order to prevent flocculation, aggregation, sedimentation and/or precipitation, and optionally to enhance affinity for a water/contaminant interface. In some embodiments, the copolymer coating is permeable so as to allow contact of a targeted substance, such as a contaminant, with the micron scale or nanoscale particle or tube, such as a nanoparticle having activity as a remediation agent. The coated materials can be micron scale or nanoscale. In one embodiment, the coated material is a nanoparticle, preferably a metal nanoparticle, more preferably an iron nanoparticle, such as a zero valent iron nanoparticle (FeNP). Other zero valent metal nanoparticles are also contemplated. The coated nanoparticle may, additionally or alternatively, contain other metals, such as zinc, magnesium, palladium or nickel. In another embodiment, the coated structure is a nanotube, preferably a carbon nanotube. When formulated for use in water remediation, such as groundwater remediation or clearing contaminants from open water such as lakes, rivers, streams or oceans, the coated material can be a water remediation agent such as an inorganic, organic, or bioremediation agent. Bioremediation agents include but are not limited to microorganisms or microorganism cultures, enzymes, enzyme additives, nutrients, nutrient additives, and the like that significantly increase the rate of biodegradation to mitigate the effects of the contaminant. Contaminants that can be targeted with the remediation agent delivery system of the invention include but are not limited to chromate, arsenic, technetium, uranium, chlorine, nitrate, pesticides, viruses, oil, petroleum, The present invention is illustrated by the following examples. It is to be understood that the particular examples, materials, amounts, and procedures are to be interpreted broadly in accordance with the scope and spirit of the invention as set forth herein.

EXAMPLES

Example 1

Sedimentation Study

Synthesis of Vinyloxyethoxy Soyate (VOES) Monomer

VOES was synthesized as follows: First, 0.42 g of KOH was dried an oven at 140° C. for 30 minutes to remove moisture. Then, 15 g of Soybean oil, 15 g of ethylene glycol monovinyl ether, and the dried KOH were mixed together in a two-neck round bottom flask and stirred for 3 hr at 70° C. The reaction mixture was then cooled to room temperature and transferred to a 250 ml separating funnel. 100 ml of n-hexane was added to the separating funnel and the solution washed with acidic, deionized (DI) water (pH 3-3.5) twice and then washed multiple time with DI water and finally with brine solution. The organic layer was dried over MgSO4 and the product isolated by vacuum stripping volatiles. Yield: 13 g (84%). 1H NMR (400 MHz, CDCl$_3$, TMS): δ (ppm) 6.45 (m, 1H), 5.34 (m, 1.5H), 4.28 (t, 2H), 4.16 (dd, 1H), 4.01 (dd, 1H), 3.85 (t, 2H, —CH—O—CH$_2$—CH$_2$—), 2.76 (m, 1.5H), 2.30 (t, 2H,), 2.03 (m, 4H), 1.57 (m, 2H), 1.29 (m, 18H), 0.86-0.97 (m, 3H). IR (neat, cm$^{-1}$): 3008 ($v_{=C-H}$), 2925, 2854 ($v_{CH2,CH3}$), 1740 ($v_{C=O}$), 1612 ($v_{C=C}$), 1117 ($v_{C-O}$).

Synthesis of Diethylene Glycol Tosylate (2-Ethoxyethyl p-toluenesulfonate)

In a 200 mL beaker, 8 g of NaOH was dissolved in a mixture of 40 mL of water and 30 mL of tetrahydrofuran (THF). In a 500 ml round-bottom flask equipped with a magnetic stir bar, 16.5 g of diethylene glycol monoethyl ether (DEGMEE) was dissolved in 30 mL of THF. The NaOH solution was added to the DEGMEE solution and the flask placed in ice-bath with magnetic stirring. The mixture was stirred until the temperature reached 0° C. To this mixture, solution of p-toluenesulfonyl chloride (25.7 g) in THF (50 mL) was added dropwise with continuous stirring. Once the addition was finished, the reaction mixture was further stirred for 2 hour. The reaction mixture was then transferred to a separating funnel and 100 ml ice water added to the funnel. After vigorous shaking, the product was extracted three times with 100 mL of methylene chloride. The organic layer was washed with 150 mL of DI water and then twice with 150 mL brine solution. The organic layer was then dried over MgSO$_4$. The colorless product was isolated by vacuum stripping volatiles. Yield: 98%. 1H NMR (400 MHz, CDCl$_3$, TMS): δ (ppm) 7.75 (d, 2H), 7.32 (d, 2H), 4.15 (m, 2H), 3.75-3.42 (m, 8H), 2.42 (s, 3H) 1.18 (t, 3H). IR (neat, cm$^{-1}$): 2974 ($v_{=C-H}$), 2923, 2874 ($v_{CH2,CH3}$), 1619 ($v_{C=C}$), 1112 ($v_{C-O}$).

Synthesis of Triethylene Glycol Ethyl Vinyl Ether Monomer

In a three neck, round-bottom flask equipped with a stirring magnet and nitrogen purge, 1.5 g of NaH was dissolved in 75 mL of THF and placed in an ice bath. Ethylene glycol monovinyl ether (4.7 g)/THF (30 mL) was added dropwise to the flask with continuous stirring. Once the addition was complete, the reaction mixture was stirred for another hour. The reaction mixture was then warmed to room temperature and further equipped with a condenser. A diethylene glycol tosylate (15 g)/THF (45 mL) mixture was then added dropwise and the reaction temperature increased to 60° C. The reaction was continued for 20 hours before cooling to room temperature. Next, 150 mL of diethyl ether and 100 mL of THF were added and the precipitate filtered off. Volatiles were subsequently removed by vacuum stripping and the remaining material dissolved in 100 mL of methylene chloride. This solution was transferred to a separating funnel and washed with DI water twice before drying with MgSO$_4$. After filtration of MgSO$_4$, methylene chloride was vacuum stripped to isolate the product. Yield: 85%. $^1$H NMR (400 MHz, CDCl$_3$, TMS): δ (ppm) 6.45 (m, 1H), 4.14 (dd, 1H), 3.93 (dd, 1H), 3.85-3.35 (m, 14H), 1.18 (t, 3H). IR (neat, cm-1): 2974 ($v_{=C-H}$), 2923, 2874 ($v_{CH2,CH3}$), 1596 ($v_{C=C}$), 1114 ($v_{C-O}$).

Copolymers of VOES and TEGEVE

Six different copolymers of VOES and TEGEVE were synthesized using carbocationic polymerization. A representative procedure is as follows: First, VOES and TEGEVE were dried with MgSO$_4$ inside a glove box to remove the trace amounts of moisture. Glassware dried at 200° C. was used to run the reaction. The dry VOES and TEGEVE were copolymerized at 0° C. in a three-neck, round-bottom flask. The procedure used to synthesize copolymer 1 (Table 1) is as follows: 75.56 g of VOES, 8.0 g of TEGEVE, and 9.6 mg of initiator (1-isobutoxyethyl acetate (IBEA)) were dissolved in 522 mL of dry toluene and chilled to 0° C. The polymerization was initiated by the addition of 6.98 mL of the coinitiator, ethylaluminum sesquichloride solution (25 wt % in toluene) ([M]$_0$:[Et$_3$Al$_2$Cl$_3$]$_0$=200:10). The polymerization was terminated after 18 hours by the addition of 522 mL of chilled methanol. Table I lists the composition of the reaction mixtures used to produce the six copolymers. The addition of the methanol for terminating the polymerizations resulted in polymer precipitation for copolymers 1-4. Each of these copolymers were isolated and washed four times with methanol. The purified polymers were collected as viscous liquids after drying under vacuum (5-7 mm of Hg) overnight. For copolymers 5 and 6, after termination, methanol was removed and the polymers purified using column chromatograpy and neutral silica gel as the stationary phase to remove unreacted VOES monomer using 90/10 v/v n-hexane/ethyl acetate as the mobile phase. Once the unreacted monomer was removed, the copolymer was eluted from the column with dichloromethane. Volatiles from the solution containing the purified polymer were removed by vacuum stripping. The composition of the copolymers produced were determined using proton nuclear magnetic resonance spectroscopy ($^1$H NMR) and the results are displayed in Table II. Using differential scanning calorimetry (DSC), the thermal properties obtained for the copolymers were determined. Each copolymer displayed a single glass transition temperature (Tg) and copolymers 1 and 2 displayed a weak melting endotherm. Copolymers 3, 4, and 5 did not display a distinct melting transition. The Tg and melting temperatures obtained are provided in Table II. For comparison purposes, data for a polyVOES homopolymer and a polyTEGEVE homopolymer produced using carbocationic polymerization are also provided in the table. The molecular weight and molecular weight distribution (MWD) of the copolymers were characterized using gel permeation chromatography. The number-average molecular weight (Mn) and MWD data obtained are shown in Table II. Values of Mn are expressed relative to polystyrene standards.

TABLE I

Composition of the polymerization mixtures used to produce copolymers of VOES and TEGEVE.

| Formulation ($[M_1]_0$:$[M_2]_0$:$[I]_0$: $[Et_{1.5}AlCl_{1.5}]_0$) | VOES ($M_1$) wt., g | TEGEVE ($M_2$) wt., g | Initiator (I) wt., mg | Co-initiator ($Et_{1.5}AlCl_{1.5}$) volume, ml | Toluene volume, ml |
|---|---|---|---|---|---|
| Copolymer1 | 75.56 | 8.00 | 9.6 | 6.984 | 522 |
| Copolymer2 | 58.33 | 15.00 | 9.0 | 6.576 | 458 |
| Copolymer3 | 45.20 | 27.12 | 9.8 | 7.175 | 452 |
| Copolymer4 | 6.25 | 15.00 | 3.4 | 2.502 | 132 |
| Copolymer5 | 2.85 | 15.00 | 3.0 | 2.220 | 110 |

TABLE II

Data obtained for copolymers of VOES and TEGEVE.

| Polymer | Wt. % VOES | Wt. % TEGEVE | Tg (° C.) | Tm (° C.) | Mn (g/mole) | MWD |
|---|---|---|---|---|---|---|
| polyVOES | 100 | 0 | −102 | −31 | 19,400 | 1.14 |
| polyTEGEVE | 0 | 100 | −77 | — | 15900 | 1.51 |
| Copolymer1 | 85 | 15 | −96 | −35 | 15,900 | 1.24 |
| Copolymer2 | 70 | 30 | −92 | −35 | 14,800 | 1.28 |
| Copolymer3 | 49 | 51 | −82 | −40 | 18,000 | 1.34 |
| Copolymer4 | 25 | 75 | −80 | — | 16100 | 1.39 |
| Copolymer5 | 16 | 86 | −79 | — | 15500 | 1.43 |

These copolymers were then reacted with mercaptopropionic acid to introduce carboxylic groups into the polymer via the unsaturated fatty acid ester groups derived from VOES repeat units. A general procedure for the thiol-ene reaction is as follows: copolymer, mercaptopropionic acid (3 molar equivalents relative to the molar equivalents of double bonds in the copolymer), and benzophenone (0.002 molar equivalents relative to copolymer double bonds) were taken in a 50 ml beaker. Reaction was run for 5 hours using an overhead UV lamp (DYMAX 2000-EC UV flood lamp, 40-50 mW/cm$^2$) and stirring at 500 rpm. The reaction was successfully conducted in a beaker and covered with a quartz lid. Table III shows the compositions of the reaction mixtures used to produce carboxylic acid-functional copolymers. To purify the copolymers, the reaction mixtures were slowly precipitated into rapidly stirring hexane. Then, the majority of the hexane was decanted off and the remaining material dissolved in a minimum amount of THF. The THF solution was precipitated into hexane, the hexane decanted off, and the precipitate redissolved in THF. This process was done 10 times to ensure high purity of the carboxylic acid-functional copolymers. After purification, the copolymer sample were isolated by vacuum stripping the volatiles. NMR was to confirm and the successful grafting of carboxylic acid groups to the copolymers and determine the purity of the final product.

TABLE III

Composition of the reaction mixtures used to produce carboxylic acid-functional copolymers from copolymers 1-5. Carboxylic acid-functional copolymers are identified by placing the letter "C" after the designation used to identify the parent copolymer. For example, "copolymer1-C" is the carboxylic acid-functional derivative produced from "copolymer1."

| Formulation ($[M_1]_0$:$[M_2]_0$:$[I]_0$: | Copolymer (M1) wt., g | Mercaptopropionic acid ($M_2$) wt., g | Benxophenone wt., mg |
|---|---|---|---|
| Copolymer1-C | 4.98 | 5.78 | 7 |
| Copolymer2-C | 5.07 | 4.84 | 5 |

TABLE III-continued

Composition of the reaction mixtures used to produce carboxylic acid-functional copolymers from copolymers 1-5. Carboxylic acid-functional copolymers are identified by placing the letter "C" after the designation used to identify the parent copolymer. For example, "copolymer1-C" is the carboxylic acid-functional derivative produced from "copolymer1."

| Formulation ($[M_1]_0$:$[M_2]_0$:$[I]_0$: | Copolymer (M1) wt., g | Mercaptopropionic acid ($M_2$) wt., g | Benxophenone wt., mg |
|---|---|---|---|
| Copolymer3-C | 5.33 | 3.56 | 4 |
| Copolymer4-C | 5.12 | 1.75 | 2 |
| Copolymer5-C | 5.08 | 1.12 | 1 |

Synthesis of Zerovalent Iron Nanoparticles (NZVI)

A NaBH$_4$ reduction method was used to synthesize NZVIs from iron sulfate. Overhead mechanical stirrer was used for this synthesize process. 10 g of FeSO$_4$.7H$_2$O was dissolved in 100 mL of deoxygenated DI water/MeOH (70:30 v/v) mixture in a 500 mL beaker. Once the iron sulfate was dissolved, 5N NaOH solution was added dropwise to make the pH of the above solution in the range 6.1-6.3. 50 mL of NaBH4 solution (2 M) was added with the help of a burette at a speed 0.5 mL/s. The reaction mixture was stirred for another 30 minutes after the addition was finished. Then, the nanoparticles were washed with methanol 5 times. The NZVIs were then dried in a vacuum oven for overnight. After drying, the nanoparticles were left at ambient conditions for 12 hours before transferring them to a glove box. Once in the glove box, the material was ground with a mortar and pestle and stored inside a glass vial.

Polymer Coated Zerovalent Iron Nanoparticle (CNZVI) Preparation 10 mg of NZVI particles were mixed with 12 mL of an aqueous dispersion of copolymer in a 20 ml vial. Various concentrations (5 gL$^{-1}$, 10 gL$^{-1}$ and 15 gL$^{-1}$) of copolymer in deoxygenated DI water were used. After adding the NZVIs to the aqueous copolymer dispersions, the mixtures were sonicated for 30 minutes to break-up NZVI agglomerates and rotated in a custom-made, end-over-end shaker (85 rpm) for 72 hours to allow the copolymer to adsorb (i.e. coat) onto NZVI surfaces.

Particle Sedimentation Studies

Figure 1:
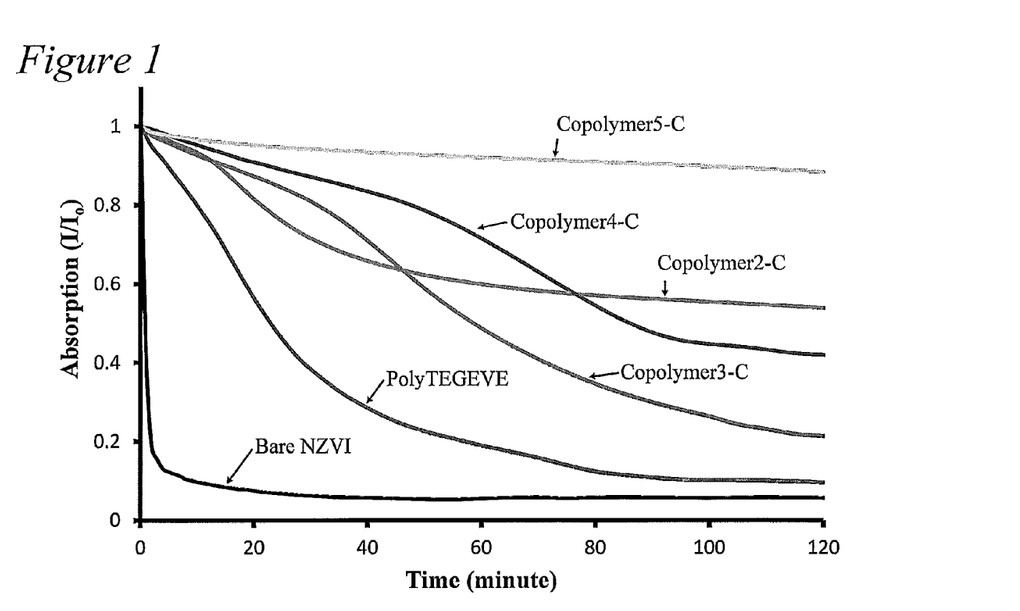
FIG. 1 shows sedimentation behavior of zerovalent iron nanoparticles (NZVIs) treated with various carboxylic acid-functional copolymers.
Figure 2:
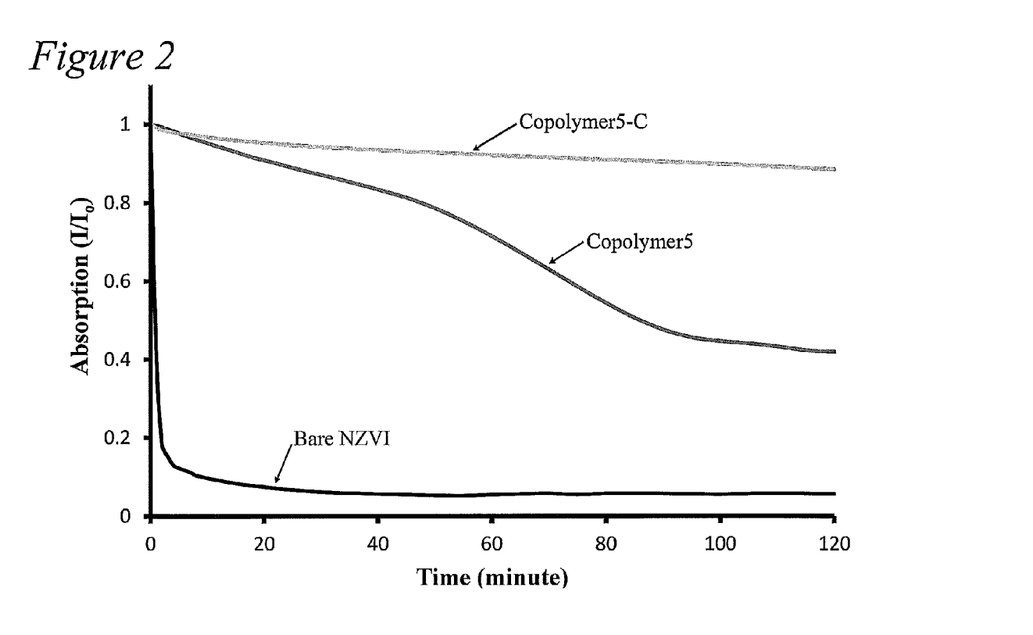
FIG. 2 shows sedimentation behavior of NZVIs comparing bare NZVIs to NZVIs treated with copolymer5 and copolymer5-C, respectively.
Figure 3:
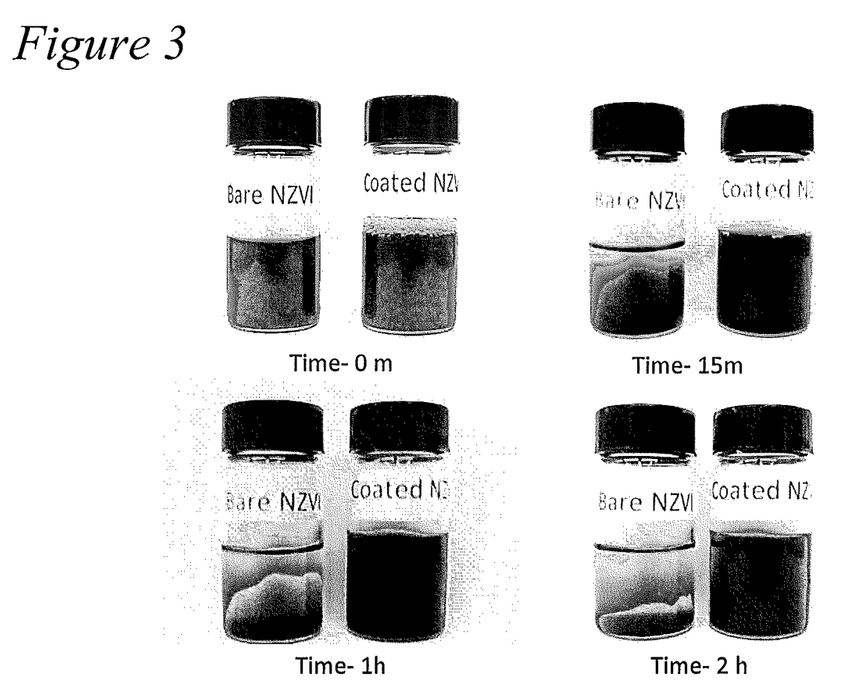
FIG. 3 shows images of dispersions of bare NZVIs in deoxygenated DI water and CNZVIs treated with copolymer5-C in deoxygenated DI water at different times after shaking.

UV-Vis spectroscopy was used to characterize the ability of copolymers to suspend the NZVIs in deoxygenated DI water. For the measurements, a well-mixed suspension of CNZVIs (2 ml of a 1 g/L suspension of CNZVIs in water) was deposited into a quartz cuvette and the change in transmitted light intensity at a wave length of 508 nm monitored over time (2 h) using a UV spectrophotometer (Cary 50000, Varian, Calif., USA). The same evaluation was done for a control consisting of uncoated (bare) NZVI in deoxygenated DI water. FIG. 1 shows that all CNZIs exhibited lower segmentation rates than the bare NZVI. Poly-VOES, copolymer1, and copolymer1-C failed to coat the NZVI because of their very poor solubility/dispersability in water, and, as a result, the sedimentation behavior of coated NZVIs involving these polymers was not performed. Poly-TEGEVE coated NZVIs and bare NZVIs were taken as controls. The data obtained indicate that the carboxylic acid-functional copolymers (copolymer2-C to 5-C) provide better resistance to sedimentation than their carboxylic acid-free copolymer analogs. As an example, the sedimentation behavior of copolymer5-C and copolymer5 are shown in FIG. 2, which shows that the use of copolymer5-C provides a major enhancement in the resistance to particle sedimentation. Visual analysis was also carried out to characterize particle sedimentation behavior. FIG. 3 displays images of dispersions of bare NZVIs in deoxygenated DI water and CNZVIs treated with copolymer5-C in deoxygenated DI water at different times after shaking. Since the particles are black, it can be easily seen that the CNZVIs stay suspended in water for a much longer time than the bare (i.e. uncoated) NZVIs.

Dispersion of Multiwall Carbon Nanotubes (MCNTs)

Figure 4:
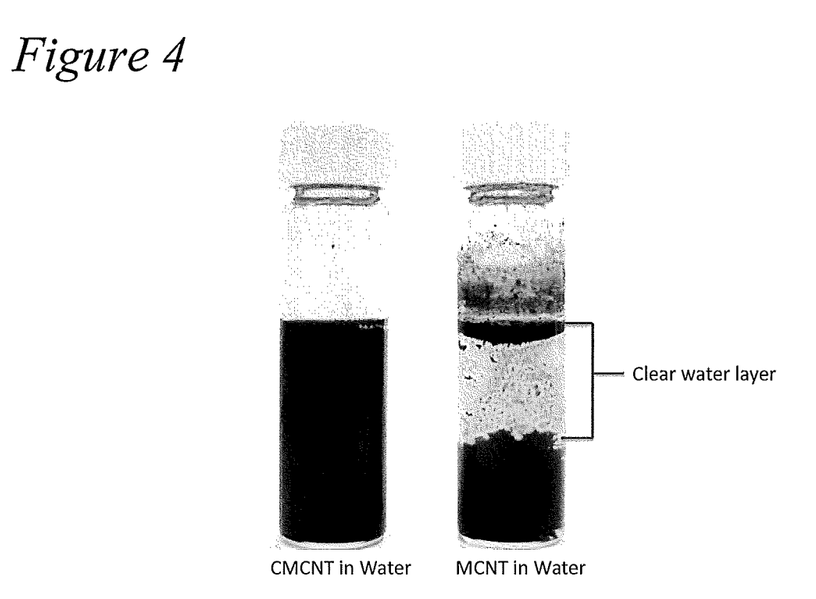
FIG. 4 shows images of dispersions of multiwall carbon nanotubes (MCNTs) in water with (CMCNT) and without (MCNT) treatment with copolymer5-C. Images were taken two hours after preparation.

The ability of the copolymers to disperse/suspend MCNTs in water was investigated. In an 8 mL glass vial, 6 mL DI water and 60 mg of copolymer5-C were mixed well using a vortex mixer. To this mixture, 60 mg of MCNT were added and the mixture sonicated for 4 seconds. For comparison, an analogous mixture was prepared without copolymer5-C. As shown in FIG. 4, the MCNTs treated with copolymer5-C remained nicely dispersed and suspended in water two hours after preparation while the control produced without copolymer5-C showed significant settlement and agglomeration of the MCNTs.

Biodegradability of the Copolymers

The biodegradability of the copolymers was characterized using respirometric experiments and plate counts. The experimental methods utilized were as follows:

Respirometric Experiments

For respirometric experiments, BOD Trac (Hach®) was used to measure the consumption of oxygen by bacteria during the microbial metabolic processes under different conditions. Automated data transfer software was used to collect the data from the instrument. Data from the instrument were recorded as biological oxygen demand (BOD) values, and, based on these data, polymer biodegradation was assessed. The BOD experiment was carried out over a period of 21 days. Activated sludge (MLSS) from a local municipal wastewater treatment plant (Moorhead Waste Water Treatment Plant, Minn.) was used as the seed for microorganisms. Biodegradation was evaluated by placing 300 mg of polymer in the reactor along with BOD nutrient solution supplied by Hach® Company. Only the seed was used (in BOD nutrient solution) as the control for the experiment. Another set of controls were run with only the polymer in BOD nutrient solution (without seed). BOD nutrient was mixed with DI water and purged with oxygen for 6 h to prepare the BOD nutrient solution. The amounts of polymer, nutrient solution, and seed used in the 500 mL BOD bottles (reactors) were 300 mg of polymer, 158 mL of BOD nutrient, and 2 mL of MLSS.

Plate Count for Bacterial Growth

The plate count method was used to measure the number of viable cells in the reactors. A sterile environment was maintained during the experiment. To conduct the experiment, reactors were run as described in the previous section (respirometric experiments), but the bottles were closed with a rubber septum rather than connecting them to the respirometer. Samples were taken out with a 6 inch long sterile steel needle fitted to a sterile syringe. Nutrient agar as the growth media and serial dilution ($10^{-1}$ to $10^{-6}$) was done as per standard.

Results and Discussion

Figure 5:
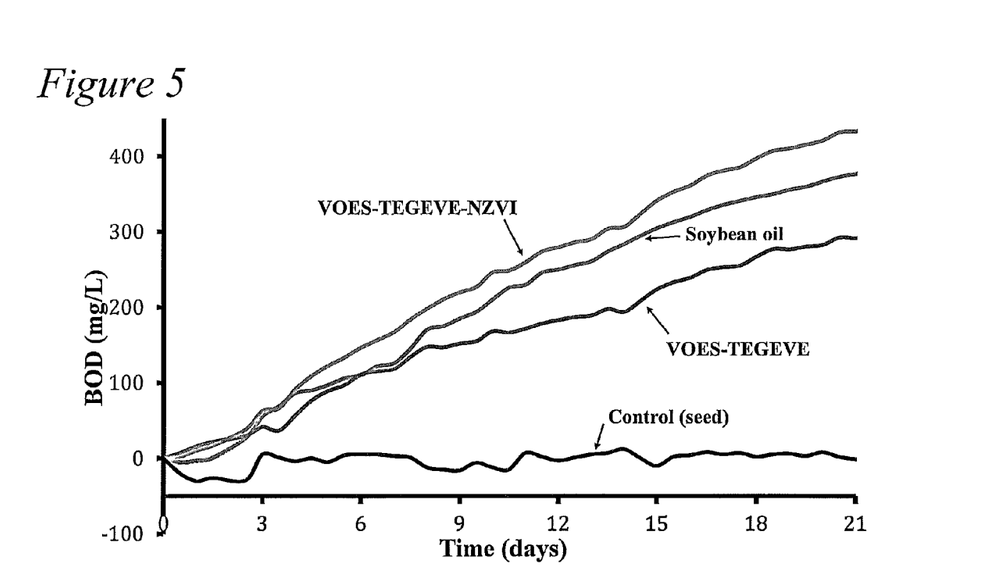
FIG. 5 shows biological oxygen demand (BOD) values as a function of time using respirometric experiments. The graph shows the BOD of soybean oil, VOES-TEGEVE copolymers, and VOES-TEGEVE copolymers coated NZVIs over time.
Figure 6:
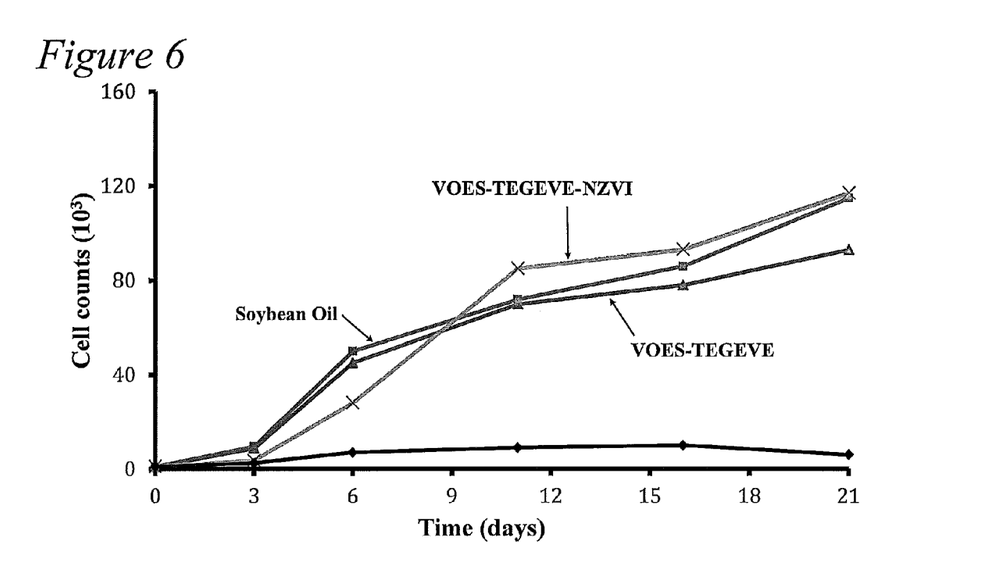
FIG. 6 shows growth of microorganisms in the presence of soybean oil, VOES-TEGEVE copolymers, and VOES-TEGEVE copolymers coated NZVIs.

The data obtained from the respirometric experiments are plotted as BOD values with respect to time (FIG. 5). The results show that all three samples (i.e., soybean oil, VOES-TEGEVE copolymer (50/50 wt./wt. VOES/TEGEVE) and VOES-TEGEVE copolymer (50/50 wt./wt. VOES/TEGEVE) coated NZVI) have high BOD values compared to the controls indicating that the bacteria used the polymer as a nutrient source during their metabolic process. The data from the plate count experiments (FIG. 6) also support the result from the respirometric experiments. Results shows that VOES-TEGEVE coated NZVI had the highest number of bacteria colonies in 21 days. Based on these data, it can be concluded that the VOES-TEGEVE copolymer is biodegradable and, moreover, NZVI particles help the biodegradation process.

The complete disclosure of all patents, patent applications, and publications, and electronically available material (including, for instance, nucleotide sequence submissions in, e.g., GenBank and RefSeq, and amino acid sequence submissions in, e.g., SwissProt, PIR, PRF, PDB, and translations from annotated coding regions in GenBank and RefSeq) cited herein are incorporated by reference. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

All headings are for the convenience of the reader and should not be used to limit the meaning of the text that follows the heading, unless so specified.

What is claimed is:

1. A coated nanostructure comprising a nanostructure coated with a copolymer comprising:
at least one vinyl ether monomer having the structure wherein $R^1$ is a divalent organic group; Z is a heteroatom selected from O, N or S; $R^2$ comprises an aliphatic group obtained from a plant oil; and $R^6$, $R^7$, and $R^8$ are each independently H or alkyl; and
at least one polyethylene glycol alkyl vinyl ether monomer having the structure wherein $R^9$, $R^{10}$, and $R^{11}$ are each independently H or alkyl; $R^{12}$ is divalent organic group; $R^{13}$ is a monovalent alkyl; and n is 2 to 20.

2. The coated nanostructure of claim 1 wherein the nanostructure comprises a nanoparticle or a nanotube.

3. The coated nanostructure of claim 2 wherein the nanoparticle comprises iron.

4. The coated nanostructure of claim 2 wherein the nanotube comprises carbon.

5. The coated nanostructure of claim 1 wherein the plant oil-derived monomer comprises a plurality of monomers, and wherein for each of the plurality of monomers, $R^2$ is independently a C8-C21 aliphatic group obtained from a plant oil.

6. The coated nanostructure of claim 1 wherein the aliphatic group is substituted with at least one functional group selected from the group consisting of an epoxide group, an acrylate-functional group, a vinyl group, and an alcohol group.

7. The coated nanostructure of claim 1 wherein the aliphatic group is substituted with at least one functional group comprising a chelating or coordinating group.

8. A composition comprising the coated nanostructure of claim 1 and at least one bioremediation agent.

9. The composition of claim 8 wherein the bioremediation agent is selected from the group consisting of a nutrient, an enzyme, a detergent, and a microorganism.

10. A coated nanostructure comprising a nanostructure coated with a copolymer comprising a repeating unit wherein $R^1$ is a divalent organic group; Z is a heteroatom selected from O, N or S; $R^2$ comprises an aliphatic group derived obtained from a plant oil; $R^6$, $R^7$, $R^8$, $R^9$, $R^{10}$, and $R^{11}$ are each independently H or alkyl; $R^{12}$ is divalent organic group; $R^{13}$ is a monovalent alkyl; n is 2 to 20; and x and y are each independently 2 to 500.

11. The coated nanostructure of claim 10 wherein the copolymer comprises a plurality of plant oil-derived monomers, and wherein for each of the plurality of monomers, $R^2$ is independently a C8-C21 aliphatic group obtained from a plant oil.

12. The coated nanostructure of claim 10 wherein the aliphatic group is substituted with at least one functional group selected from the group consisting of an epoxide group, an acrylate-functional group, a vinyl group, and an alcohol group.

13. The coated nanostructure of claim 10 wherein the aliphatic group is substituted with at least one functional group comprising a chelating or coordinating group.

14. The coated nanostructure of claim 10 wherein the nanostructure comprises a nanoparticle or a nanotube.

15. The coated nanostructure of claim 14 wherein the nanoparticle comprises iron.

16. The coated nanostructure of claim 14 wherein the nanotube comprises carbon.

17. A composition comprising the coated nanostructure of claim 10 and at least one bioremediation agent.

18. The composition of claim 17 wherein the bioremediation agent is selected from the group consisting of a nutrient, an enzyme, a detergent, and a microorganism.

* * * * *